UNITED STATES PATENT OFFICE.

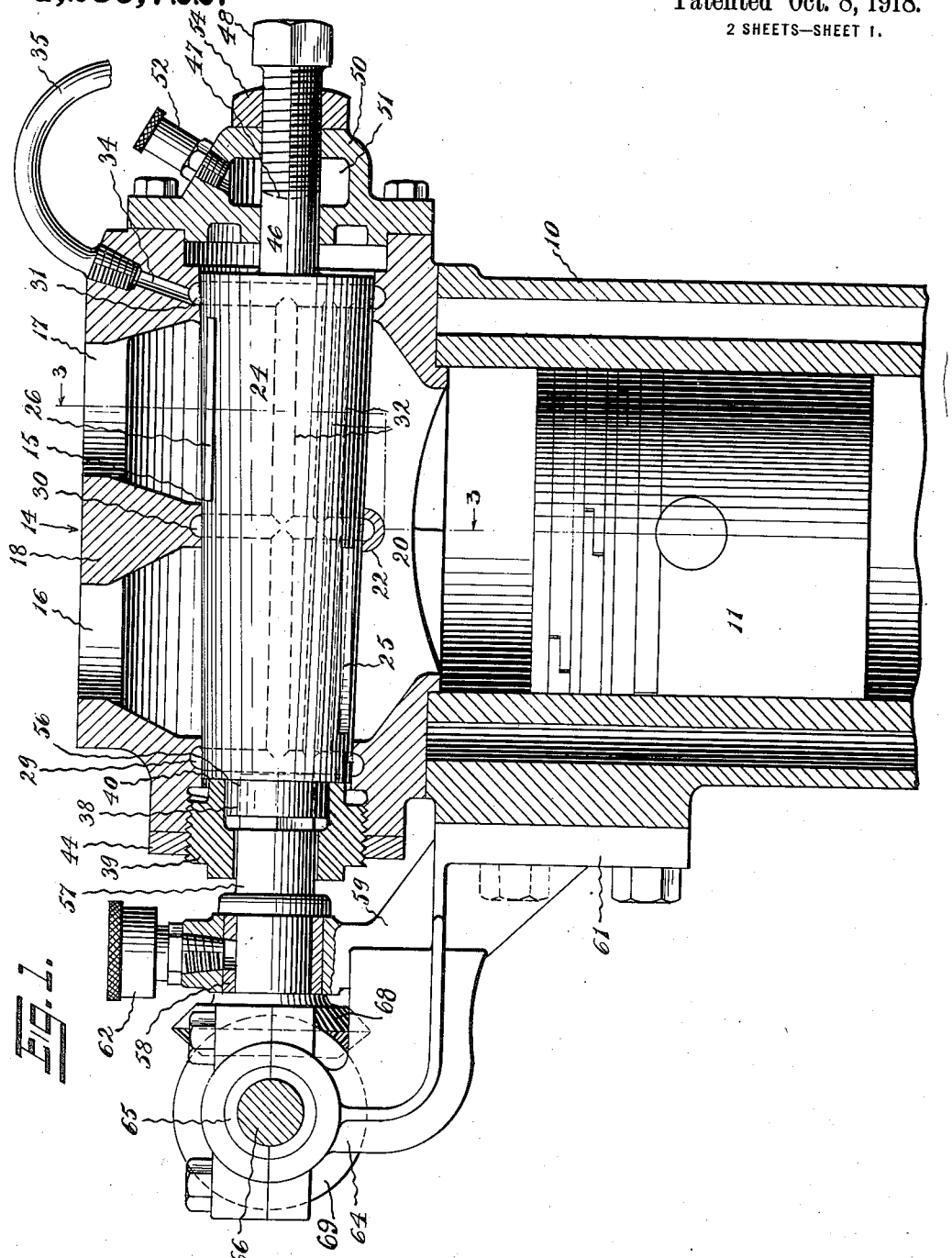

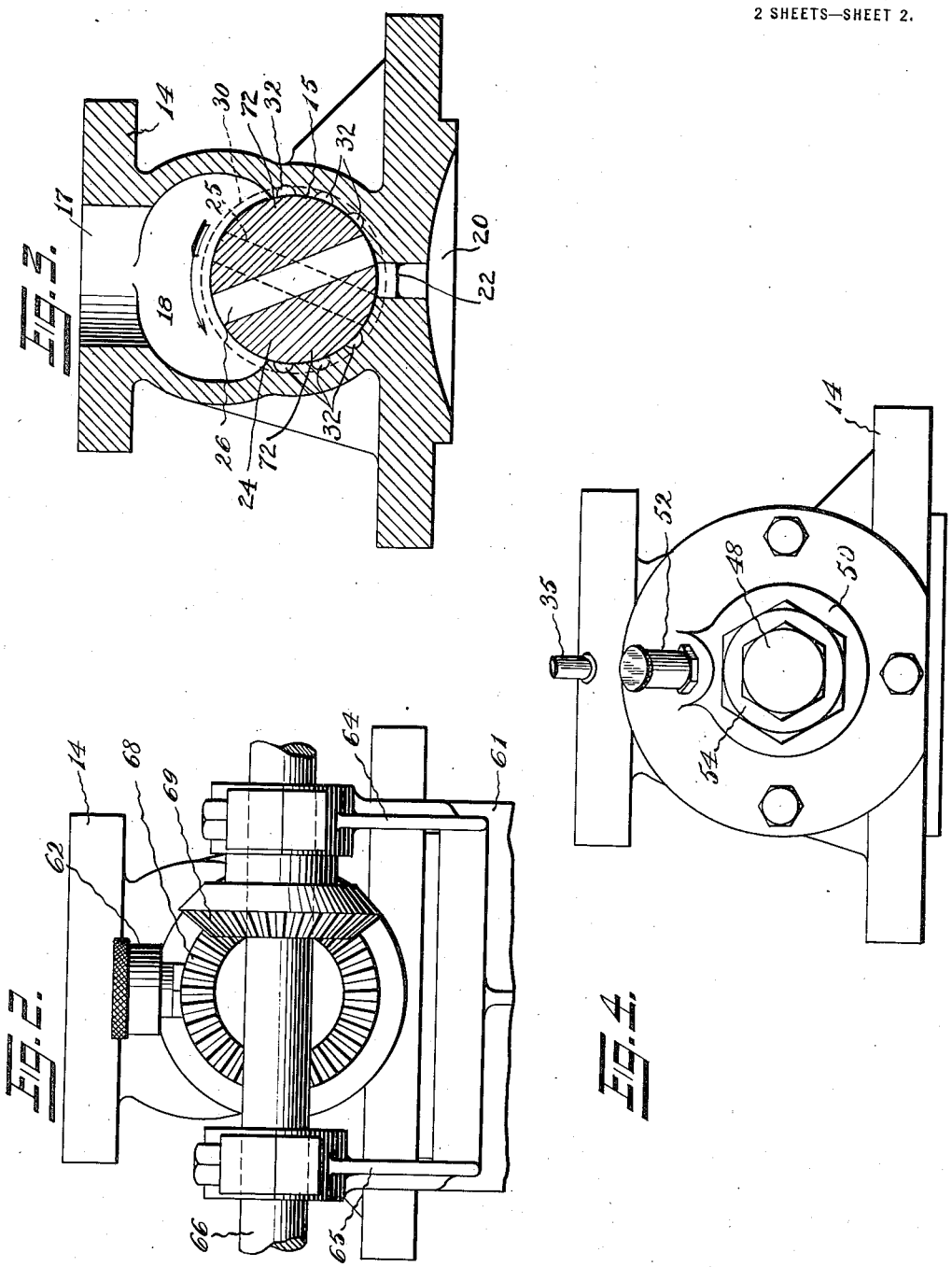

GEORGE V. HARRIMAN, OF NEW YORK, N. Y.

ROTARY VALVE.

1,280,722.

Specification of Letters Patent.

Patented Oct. 8, 1918.

Application filed September 15, 1917. Serial No. 191,517.

*To all whom it may concern:*

Be it known that I, GEORGE V. HARRIMAN, a citizen of the United States, residing in New York city, in the county of New York and State of New York, have invented certain new and useful Improvements in Rotary Valves, of which the following is a specification.

This invention relates to valves for internal combustion engines and has for one object to provide an easily adjusted accessible valve which can be easily removed and replaced without interfering with the timing.

Another object of the invention is to provide a positive and freely acting valve which delivers the charge directly to the cylinder and permits accurate quantities of gas to be supplied thereto.

Another object is to obviate the necessity of any use whatever of springs for controlling the valve.

Another object is to provide a valve in which an exchange of heat takes place between the hot exhaust gases and the cool incoming fuel, whereby the fuel is warmed and the exhaust gas cooled. These and other objects will appear as the description proceeds.

While herein I describe minute details of the invention, the invention is not limited to these, since the details of construction and combination may be greatly varied without departing from the spirit and scope of the invention as claimed.

In the accompanying drawings showing, by way of example, one of many possible embodiments of the invention;

Figure 1 is a central vertical sectional view showing my improved valve applied to the cylinder of an internal combustion engine;

Fig. 2 is a fragmental side elevation showing the mechanism for actuating the valve;

Fig. 3 is a sectional view taken on the line 3—3 of Fig. 1; and

Fig. 4 is an elevation showing details of the adjusting mechanism for one end of the valve.

Referring more particularly to the drawings, my invention is shown as applied to an internal combustion engine having a cylinder 10, having therein a piston 11 and provided with a cylinder head 14. Said cylinder head is provided with a slightly tapering valve seat 15, and an inlet passage 16 and an exhaust passage 17 intersecting said tapering valve seat, and separated by a bridge 18 above said seat. Below said seat said passages merge into each other and form a combustion chamber 20 at the head of the cylinder, said bridge 18 extending below said seat in a reduced portion 22 for purposes which will be explained.

Snugly fitting and rotatable within said valve seat is the tapered plug-valve 24 provided with a transverse inlet port 25, and a similar exhaust port 26 arranged in staggered relation with the inlet port as shown in Fig. 3.

The middle part and opposite ends of said seat are provided with annular oil grooves 29, 30, and 31, which are connected by connecting grooves 32 (Fig. 3). One of said annular grooves, for instance, the groove 31, communicates with an oil duct 34, which is supplied with oil through a tube 35 from a suitable oil pump or source of oil supply not shown. The annular grooves are entirely covered by the ends of the seat and by the bridge 18 and the reduced portion 22, to prevent the forcing, by the explosion, of oil back through the duct 34.

The valve 24 is held against longitudinal play and is axially adjusted to insure a nice fit within its seat, by means which will now be described. The smaller end of the valve is provided with a reduced portion 38 which is received, with a slight clearance, within a bearing collar 39, screwed into the cylinder head at the smaller end of the valve seat, and bearing against the end of the valve 24 to form a thrust bearing therefor at the face 40, which face receives lubricating oil through leakage from the annular groove 29. Said thrust collar is adjusted toward or away from the valve seat by means of its threaded connection with the cylinder head and is held in adjusted position by means of a jam nut 44. The other end of the valve is provided with a thrust stem 46 having a concave face at its outer end against which bears the balled end 47 of the thrust screw 48 having screw threaded connection with the grease cap 50 bolted to the cylinder head. Said grease cap is formed with a grease chamber 51 fed from a pressure grease-cup 52, and surrounds the outer end of the thrust spindle, whereby the latter is always provided with sufficient lubricant. The thrust stem 48 may be adjusted toward or away from the spindle 46, and is locked in adjusted position by means of a jam nut 54.

The reduced portion 38 is provided with a four square hole 56 receiving the squared end of a short-shaft 57, rotatable in a bearing 58 carried on a standard 59 provided on the bracket 61 bolted to the side of the cylinder 10. Said bearing 58 is fed from a grease-cup 62.

The bracket 61 has mounted thereon, extensions 64 carrying bearings 65 in which is rotatable a drive-shaft 66, from which rotation is imparted to said short-shaft 57 by means of miter gears 68 and 69. The shaft 66 is driven from any suitable movable part of the engine, so that the valve rotates in the direction of the arrow of Fig. 3, and is timed so that the ports 25 and 26 are opened and closed at proper times during the cycle of the piston.

This valve is illustrated as adapted for a four-cycle engine though the invention is, of course, not so limited. The valve makes one fourth of a rotation for each rotation of the engine crank.

The operation is as follows:

Referring to Fig. 3, it is seen that the exhaust port has just cleared the explosion chamber 20, in which position the upstroke (instroke) of the piston has just been completed. The downstroke then commences and during this complete stroke the valve rotates (anticlockwise in Fig. 3) one eighth of a rotation, during which time the inlet port 25 comes into and out of register with the explosion chamber, whereby the inlet port is opened and closed, thus feeding fuel during substantially the entire downstroke. The next upstroke is the compression stroke and during that time one of the points marked 72 (Fig. 2), moves into register with the combustion chamber 20, at which point the upstroke is completed and sparking and explosion takes place. During the next stroke, a downstroke, expansion takes place and the valve moves another eighth of a rotation and brings the exhaust port nearly to the opening of the combustion chamber. During the next stroke, an upstroke, the exhaust port moves into and out of register with the combustion chamber, and the cycle is completed, the valve having rotated one half of a rotation. During the next half rotation, the other half of the valve functions in exactly the same way as just described.

The advantages and possibilities of the invention are apparent. The construction gives a positive, yet freely acting valve which delivers and removes the accurate charges directly to and from the piston, thus permitting the proper quantities of gas to be accurately supplied. Each cylinder is provided with a head constituting the valve assembly, providing accessibility to each cylinder, or to other assemblies or valves, entirely independently of each other, and permitting removals and adjustments without interference with the valve adjustment or valve during assembly.

The means for producing and controlling the valve action is entirely without springs, and is in easily accessible position. The adjustment of the valves may be made by external marks and measurements, thus avoiding the chance of mistakes or the necessity of road tests, and assuring proper setting.

Another feature of advantage is that the invention provides a one-port system which simplifies the fuel supply and reduces back pressure of the exhaust to practically atmospheric pressure. The valves are long and slightly tapered and placed cross-wise in the cylinder head; and the longitudinal adjustment and fit of the valve is governed by a thoroughly practical arrangement which permits easy removal and accurate adjustment of the valve without any interference with any other part.

The valve action is positively governed from the piston position by a simple and positive method which avoids too early and too late valve openings.

The valve is always cushioned and in a measure supported by a cushion of oil forced in at the grooves 29, 30, 31, and 32, thus insuring ease of running and proper functioning.

The connection between the valve plug and the shaft 57 is a floating connection, which permits all parts to be easily assembled and adjusted and prevents binding of the parts.

I claim:

1. In an internal combustion engine, the combination of a valve head provided with a passage passing therethrough and a tapering valve seat intersecting said passage; a tapering valve plug in said seat and provided with a port coöperating with said passage; adjustable thrust means secured to said head and engaging the end face of the smalled end of the valve plug; and drive means having connection with said smaller end.

2. In an internal combustion engine, the combination of a valve head provided with a passage passing therethrough and a tapering valve seat intersecting said passage; a tapering valve plug in said seat and provided with a port coöperating with said passage; adjustable thrust means secured to said head and engaging the end face of the smaller end of the valve plug; and drive means having floating connection with said smaller end.

3. In an internal combustion engine, the combination of a cylinder provided with inlet and exhaust passages and a tapering valve seat intersecting said passages; a tapering valve plug in said seat and provided with ports coöperating with said passages; an adjustable thrust collar screwed in said seat and engaging the smaller end of the valve plug; and drive means passing through said collar and having floating connection with said smaller end.

4. In an internal combustion engine, the combination of a cylinder provided with inlet and exhaust passages and a tapering valve seat intersecting said passages; a tapered valve plug in said seat and provided at its smaller end with an angular hole, a thrust spindle at the larger end, an inlet and an exhaust port coöperating with said passages; an adjustable thrust collar screwed in said seat and engaging said smaller end; adjustable means engaging the end of said thrust spindle; and a shaft provided with an angular end engaging in said angular hole.

5. In an internal combustion engine, the combination of a cylinder; a cylinder head provided with inlet and exhaust passages and a tapering valve seat transverse to the cylinder and intersecting said passages; a tapered valve plug in said seat and provided at its smaller end with an angular hole, a thrust spindle at the large end, and inlet and exhaust ports coöperating with said passages; an adjustable thrust collar engaging in said seat and against said smaller end of the plug; a removable cap secured to the cylinder head; an adjusting screw screwed into said cap and engaging the head of the spindle; a bearing bracket mounted on said cylinder; and a short shaft journaled thereon and having an angular end engaging in said angular hole.

6. In an internal combustion engine, the combination of a cylinder provided with inlet and exhaust passages and a tapering valve seat intersecting said passages; a tapered valve plug in said seat and provided with a thrust spindle at the larger end, and ports coöperating with said passages; adjustable thrust means engaging the end face of said smaller end; a removable grease cap secured at the larger end of said seat and provided with a grease chamber surrounding the head of the spindle; an adjusting screw screwed into said cap and engaging against said head at the middle part of the grease chamber; and drive means having floating connection with the smaller end of the valve plug.

7. In an internal combustion engine, the combination of an engine cylinder; a cylinder head thereon provided with inlet and exhaust passages and a tapering valve seat intersecting said passages; a tapered valve plug in said seat and provided with an angular hole at its smaller end, a thrust spindle at the larger end, and ports coöperating with said passages; an adjustable thrust collar engaging in said seat and against said smaller end of the plug; a removable grease chamber cap secured to the cylinder head and provided with a grease chamber surrounding the head of said spindle: an adjusting screw screwed into said cap and engaging against said head of the spindle; and a drive shaft having an angular end engaging in said angular hole.

8. In an internal combustion engine, the combination of a cylinder provided with a valve seat in its head; a tapered valve plug in said seat; a drive shaft parallel to the piston pin of the engine and perpendicular to the valve plug and having floating connection between said shaft and plug, said plug being removable from said seat in a direction away from said drive shaft.

9. In an internal combustion engine, the combination of an engine cylinder provided with a tapering valve seat; a tapered plug in said seat; removable thrust means engaging the larger end of the plug; a bearing bracket; a valve drive shaft mounted in said bracket parallel to the piston pin of the cylinder; and a short shaft perpendicular to said drive shaft and coaxial with said plug and having geared connection with the drive shaft and floating connection with the valve plug.

10. In an internal combustion engine, the combination of an engine cylinder; a head thereon provided with passages and a tapering valve seat transverse to the cylinder and the piston pin of the cylinder; a tapered valve plug in said seat and provided with an angular hole at its smaller end; adjustable thrust means engaging both ends of the plug; removable means for supporting the adjustable thrust means at the larger end of the cylinder; a bearing bracket; a short shaft journaled thereon and having an angular end engaging in said angular hole; a valve drive shaft mounted in said bracket parallel to the engine crank shaft; and gears connecting said shafts.

11. In an internal combustion engine, the combination of an engine cylinder; a removable cylinder head thereon provided with inlet and exhaust passages and a tapering valve seat transverse to the cylinder and the engine crank shaft and intersecting said passages and provided with an oil inlet duct and annular and connecting grooves communicating with the duct; a tapered valve plug in said seat and provided with an angular hole at its smaller end, a thrust spindle at the larger end, and inlet and exhaust ports coöperating with said passages; said annular and connecting grooves being entirely closed by said valve except at said duct whereby oil may be retained therein under pressure; an adjustable thrust collar engaging in said seat and against said smaller end of the plug; a removable grease chamber cap secured to the cylinder head and provided with a chamber surrounding the head of said spindle; an adjusting screw screwed into said cap and engaging said head of the spindle; a bearing bracket mounted on said cylinder; a short shaft journaled thereon and having an angular end engaging in said angular hole; a valve drive shaft mounted in said bracket parallel to the engine crank shaft; and gears connecting said shafts.

12. In an internal combustion engine, the combination of a cylinder head provided with a tapering valve seat and with inlet and exhaust passages intersecting the valve seat; a tapered plug valve in said seat and provided at one end with an angular hole and at the other with a thrust stem, said plug valve being also provided with inlet and exhaust ports extending transversely therethrough in staggered relation; a thrust collar adjustably screwed into said head and bearing against the end of the valve carrying said hole; a grease chamber cap secured to the cylinder head and provided with a grease chamber surrounding the end of said stem; a thrust screw adjustably screwed in said cap and engaging the end of said stem; and drive means engaging in said angular hole.

GEORGE V. HARRIMAN.

Witnesses:
SAMUEL S. FRIEDMAN,
H. M. KILPATRICK.